United States Patent Office 3,492,106
Patented Jan. 27, 1970

3,492,106
TWO NEEDLE BLOW MOLDING PROCESS AND APPARATUS
Donald L. Peters and Fred Hicks, Bartlesville, Okla., assignors to Phillips Petroleum Company, a corporation of Delaware
Filed Oct. 25, 1965, Ser. No. 505,173
Int. Cl. C03b 23/08
U.S. Cl. 65—82                                         6 Claims

ABSTRACT OF THE DISCLOSURE

Relatively thick parisons for blow molding into relatively large articles are first pierced with a small pre-blow needle through which sufficient air is introduced to prevent the walls of the tube from collapsing as a second larger needle is forced through the wall of the parison. The bulk of the blow air is added through the second larger needle and the parison is blown out into conformity with a mold.

---

Figure 1:
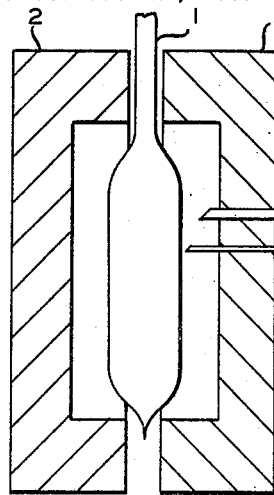

This invention relates to blow molding a hollow parison using a pre-blow needle to inflate the parison sufficiently to be punctured by a second blowing needle which introduces sufficient pressure into the parison to force the same against the mold wall. In another of its aspects, the invention relates to blow molding a hollow article from a closed hollow parison by puncturing the hollow parison with a small needle, blowing the parison to sufficient size so that it can be punctured by a larger needle, and completing the blowing by introducing fluid pressure through the larger needle. In another of its aspects, the invention relates to blow molding as hereinbefore described wherein at least one of the small needle and the larger needle is withdrawn from the parison during or subsequent to the blowing operation. In another of its aspects, the invention relates to a method of blow molding a hollow article wherein a satellite cavity is formed in a hollow closed parison, the method of penetrating the cavity by introducing fluid through a small needle to at least partially expand the cavity, puncturing the cavity with a larger needle, expanding the parison against the mold walls by introducing fluid pressure into the satellite cavity through the large needle. In a still further aspect, the invention relates to an apparatus for carrying out an aforementioned process wherein there is provided a means to advance and withdraw at least one of the small needle and the larger needle into and from the parison.

Blow molding closed hollow articles requires that the hollow closed parison be punctured by a blowing needle. As the articles to be formed become larger, the size of the needle and the thickness of the parison increases. Accordingly, it becomes more difficult to penetrate the parison with a larger blow molding needle. Oftentimes, the parison will collapse due to the force of the needle within the mold and the blowing operation will blow one wall of the parison against the other.

We have now discovered that the ability of large needles to penetrate the parison can be improved if the parison is first punctured with a small hypodermic-type needle through which enough fluid pressure can be supplied so that the parison can be punctured with a larger needle.

The needle hole left by the blow molding needle is occasionally detrimental to the appearance of the finished article. In order to reduce the undesirable surface characteristic of the blowing needles, we withdraw at least one of the needles prior to termination of blowing. The hot plastic material will flow over the hole left by the retracted needle, thus leaving a smooth surface.

By various aspects of this invention, one or more of the following, or other objects, can be obtained.

It is an object of this invention to provide a method for blow molding hollow closed articles wherein the facility by which the blow molding needle punctures the parison wall is improved.

It is a further object of this invention to provide a method of blow molding hollow closed articles whereby the surface characteristic of the article is greatly improved.

It is a still further object of this invention to provide a method and apparatus for blowing a relatively thick parison into a closed, hollow article.

It is a still further object of this invention to provide a blow molded article whose surface characteristics in the area penetrated by a blowing needle are greatly improved.

Other aspects, objects, and the several advantages of this invention are apparent to one skilled in the art from a study of this disclosure, the drawings, and the appended claims.

According to the invention, a hollow article is blown by providing a parison in a mold, puncturing the parison wall with a small needle, introducing fluid pressure into the interior of the parison through the small needle so that the parison walls will be prevented from sticking together. A larger, more substantial blowing needle then punctures the parison wall. The larger needle can penetrate the wall because the air pressure inside the parison maintains the parison wall at the locus of the larger needle against the needle. Fluid pressure at a much higher rate can then be introduced into the interior of the parison to blow the parison at a rapid rate to conform to the shape of the mold. This method is especially useful in blow molding larger articles wherein the nature of the article dictates the use of relatively thick wall parisons. Ordinarily, without using the auxiliary smaller needle with the thick wall parisons, the larger blowing needles will have difficulty penetrating the parison wall without pushing one wall against the opposite wall.

The parison can consist of extruded tubing, pinched off at the ends thereof, or can be made from a pair of sheets which have been sealed at the edges providing a hollow parison.

The blowing needles can be movable axially so that the needles move into and out of the mold cavity to penetrate the parison and withdraw from the parison during or after blowing. Alternately, the blowing needles can be stationary. In the latter case, the parison would expand under the pressure of the smaller needle against the larger needle and thereby be penetrated by the larger needle.

Figure 2:
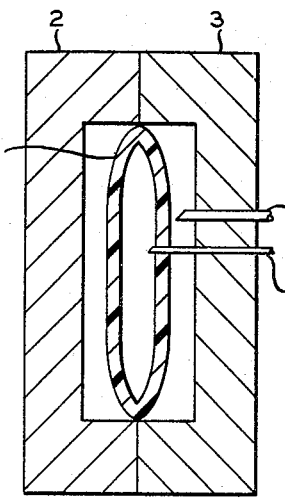
Figure 3:
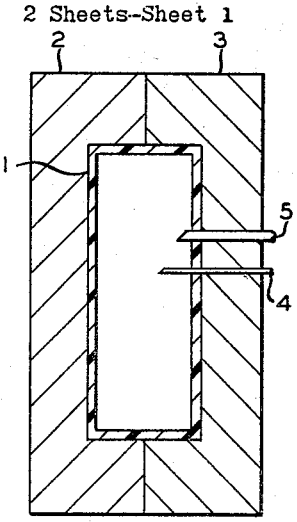
Figure 6:
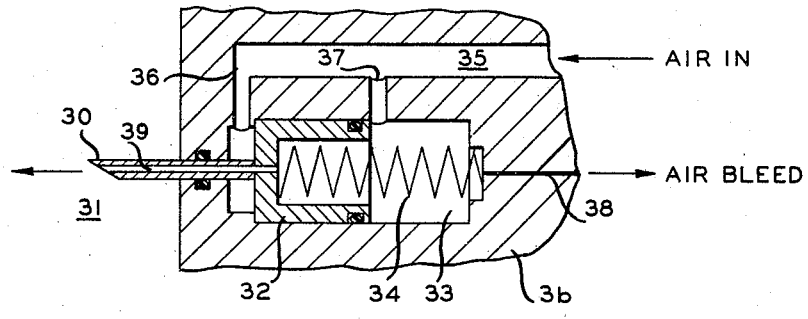
Figure 7:
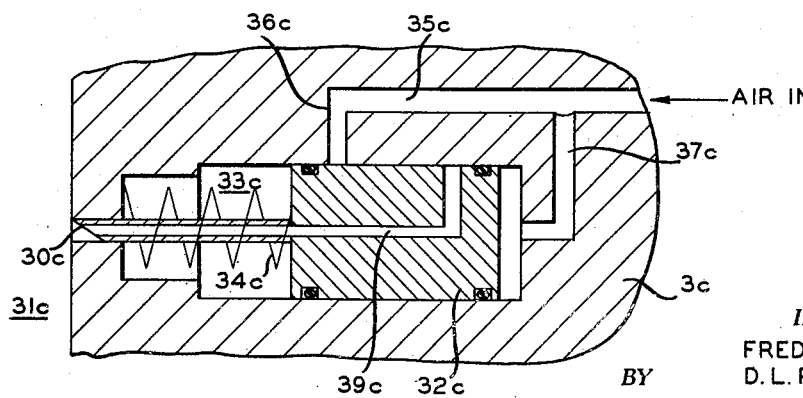
Figure 5:
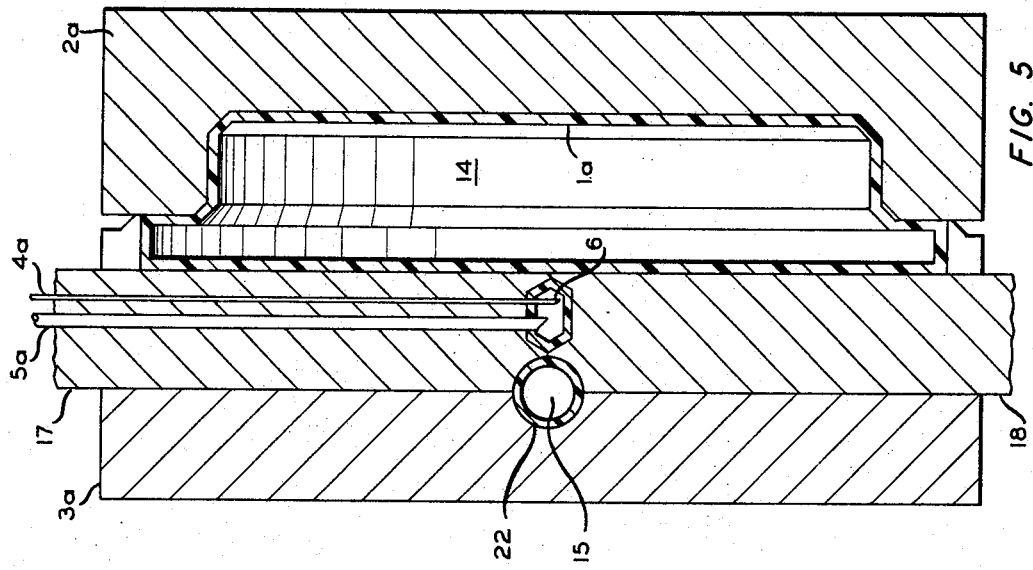
Figure 4:
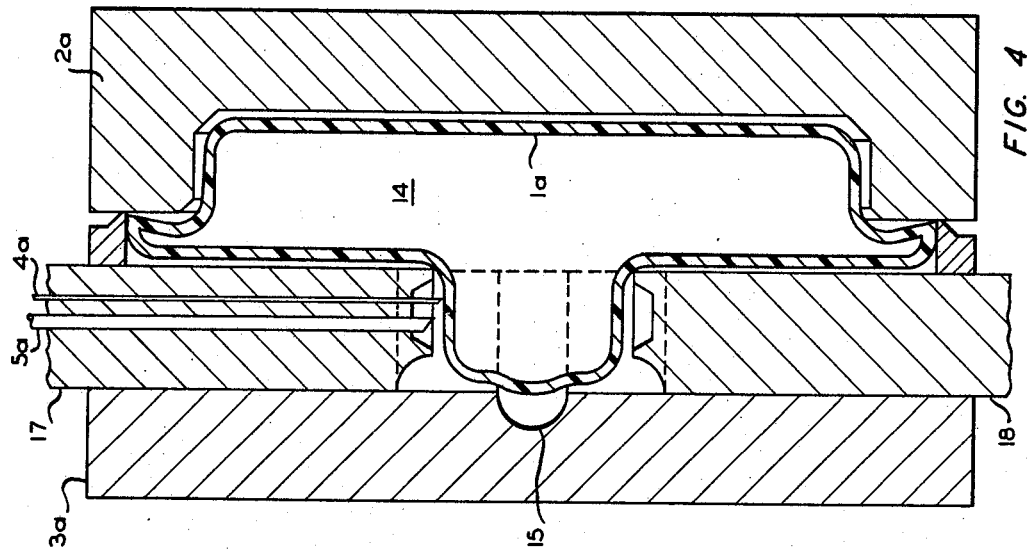

The invention can be illustrated by reference to the accompanying drawing in which FIGURES 1, 2 and 3 show the process of the invention in the simplest embodiment; FIGURES 4 and 5 illustrate the invention as it relates to a hollow article having a hollow handle integrally attached thereto; and FIGURES 6 and 7 illustrate alternate retracting mechanisms which can be used with either blow molding needle.

Referring now to the drawings, specifically FIGURES 1–3, there is provided a closed hollow parison 1 which can be formed from extruded tubing or a pair of sheets as hereinbefore described. The parison 1 is placed between mold halves 2 and 3 which define an interior cavity. A small needle 4 and a larger needle 5 are provided in mold cavity 3. As the mold halves 2 and 3 close, the parison 1 will be punctured by the smaller blowing needle 4. Fluid pressure can then be introduced through the smaller blowing needle 4 to build up pressure inside the parison 1. The larger needle 5 then punctures parison 1, either due to the expanding parison or as a result of the larger blowing needle 5 advancing into the parison 1. As seen in FIGURE 3, the larger blowing needle 5 has penetrated parison 1 whereby a larger rate of fluid pressure introduction into the parison expands it against the mold walls.

Referring now to FIGURES 4 and 5, the invention is described as relates to a method and apparatus for making hollow articles having hollow handles molded integrally therewith. In Ser. No. 452,997, filed May 4, 1965, now Patent No. 3,342,916 and Ser. No. 452,996, filed May 4, 1965, and now abandoned both of which applications are incorporated herein by reference, there is described and claimed a method and apparatus for making a hollow article having a hollow handle integrally molded thereto. FIGURES 4 and 5 relate to the invention as applied to the method and apparatus of the aforementioned applications. Referring specifically now to FIGURES 4 and 5, there is provided in mold half 3a, sliding core inserts 17 and 18. Sliding core insert 17 contains small blowing needle 4a and large blowing needle 5a. In operation of this embodiment, a hollow parison is introduced between mold cavities 2a and 3a and pinched off to make a closed hollow parison. This stage of the operation is shown in FIGURE 4. Preferably, the parison will be at least partially blown so that a portion of the parison will enter recessed area 15 of mold half 3a. Sliding core inserts 17 and 18 are then actuated to pinch out a satellite cavity from a parison, as illustrated in FIGURE 5. The satellite cavity is connected to area 14 and area 15. As the sliding core inserts pinch off the satellite cavity, small needle 4a will puncture satellite cavity 6. Fluid pressure is then introduced through needle 4a to at least partially expand the parison satellite cavity 6 against needle 5a. Needle 5a will then puncture satellite cavity 6 either due to the expansion of the parison in the satellite cavity, or due to advancement of needle 5a into the satellite cavity. The object can then be blown by introducing high pressure fluid through large needle 5a, which fluid flows through satellite cavity 6 into the interior 15 of hollow handle 22, and into the interior portion 14 of the hollow article.

If the needles 4a and 5a are stationary, it is preferable to have needle 4a extend into satellite cavity 6 farther than needle 5a. It is within the scope of the invention to provide a means to advance and retract both needle 4a and needle 5a independently into and out from the satellite cavity 6, either prior, during, or subsequent to the blowing operation.

Referring now to FIGURE 6, there is shown a means for advancing and retracting a needle such as needles 4, 5, 4a and 5a into and out from the mold cavity. The advancing and retracting mechanism is placed in mold wall 3b. Hollow needle 30 having air channel 39 is attached to piston 32 which slides in piston chamber 33. Spring 34 biases piston 32 in the forward end of the chamber 33. Air supply duct 35 has duct 36 connected to an area of chamber 33 in front of piston 32 and channel 37 connected to a central portion of chamber 33. An air bleed duct 38 is provided in the rearmost portion of chamber 33.

In operation, at the beginning of the operation, piston 32 can be in the rearmost or forwardmost position. If in the rearmost position in chamber 33, air pressure in line 35 through line 36 causes the piston to be in the retracted position. If the air supply is shut off, the needle will immediately advance due to spring 34 into the mold chamber 31, wherein it will penetrate the parison. As blowing continues, the fluid pressure being supplied through line 35, line 37 and duct 39, the parison pressure will reach equilibrium with the pressure in chamber 33. At this time air begins to bleed from chamber 33 through duct 38. The pressure in the forwardmost end of chamber 33, pressure being supplied through line 36, will force piston 32 to the rear of the chamber 33. As can be seen by the drawing, this causes needle 30 to retract from mold cavity 31.

Referring now to FIGURE 7, there is provided in a mold half 3c having mold cavity 31c a piston 32c which slides in chamber 33c. Piston 32c has air duct 39c extending through needle 30c. Spring 34c biases the piston 32c into the rearmost portion of chamber 33c. Air or other fluid pressure is supplied through line 35c, 36c and 37c.

In operation, the piston 32 will be preferably in the retracted position initially. When it is desired to advance needle 30c into mold cavity 31c to penetrate the parison, air pressure is supplied through line 35c. The air pressure passing through line 37c forces piston 32c to the forwardmost end of chamber 33c whereby the needle 30c extends into the parison. Fluid pressure can then flow through line 36c, air duct 39c and into the parison thus punctured. At the end of the blowing operation, the air supply is cut off, at which time the piston will be retracted to the rearmost portion of chamber 33 due to the spring biasing action.

The retraction of the needle from the parison wall during or after the blowing operation improves the surface characteristic of the finished article in the area which has been penetrated by the blowing needle. When the article is still being blown and is hot, or even after the object has been blown and the needle has been withdrawn, the hot plastic will flow over the hole left by the needle. Thus, it is possible to maintain both small and large needles in the parison during substantially all of the blowing operation. When the blowing operation is nearly finished, the large needle can be retracted and the fluid pressure maintained through the small needle. The retraction of the larger needle will allow the plastic in the parison wall to flow over the hole left by the larger needle. At the end of the blowing operation, the small needle can be retracted, thus allowing the plastic to flow over the area left by the small needle. Obviously, the smaller needle can be retracted prior to the retraction of the larger needle as desired. The use of the retractable needles not only improves the surface characteristic of the finished article, but allows the article to be ejected from the mold at a much higher rate. A stationary needle would cause delay because the article would have to be removed from the needle before it could be ejected from the mold.

The size of the needles can vary greatly and is dependent upon the size of the part being molded and the thickness of the parison. Generally, a large needle will be from $\frac{1}{8}''$ to 1 inch in diameter, and from $\frac{1}{16}''$ to 2 inches long. Generally, the small needle will be from $\frac{1}{64}''$ to $\frac{1}{4}''$ in diameter and from $\frac{1}{16}''$ to 2 inches long. The small and large needles may be of equal length or different lengths. In some instances, it may be of an advantage to have the large needle very short so as to reduce tearing of the parison as it is blown out against the mold.

The following is a specific example of this invention. A water cooler lid with a handle integrally thereto was molded on the apparatus described and claimed in the apparatus of FIGURES 4 and 5. For this lid, Marlex 5003, a copolymer of ethylene and butene having a density of 0.95 and a melt index of 0.3, was used. The stock temperature was 380° F. The parison was extruded in a time of 11 seconds, placed into the mold cavity and preblown. The sliding core inserts were then activated to punch out the handle cavity. Two stationary needles were affixed to one of the sliding inserts. The large needle was $\frac{1}{4}$ inch in diameter and $\frac{3}{4}$ inch long. The small needle was about $\frac{1}{16}$ inch in diameter and $\frac{3}{4}$ inch long. As the inserts were closed, the small needle punctured the parison. Air under 40 pounds pressure was introduced through this needle which forced the parison in the satellite cavity out against the wall, causing the large needle to puncture it. Air under 80 pounds pressure was then introduced through the large needle which ruptured any web which may have formed over the channels. Fluid pressure then flowed through the channels to expand the parison out against the rest of the mold. The total cycle time was 100 seconds. The lid weighed 17 ounces.

The invention can be used to blow mold many kinds of hollow articles. It could be used to blow mold bottles as well as hollow water cooler lids disclosed in copending Ser. No. 452,996 now abandoned. Further, the invention can be used to blow mold hollow explosive containers such as those disclosed and claimed in copending application Ser. No. 412,811, filed Nov. 20, 1964, now Patent No. 3,306,200.

It is obvious that vacuum molding could be employed in the invention as well as blow molding. In such a case, the mold walls would be provided with vacuum ports and air or other fluid could be introduced into the interior of the parison through one or both blowing needles.

It is within the scope of the invention to provide instead of a second needle a plurality of needles which would puncture the parison after the pre-blow needle has supplied fluid pressure into the interior of the parison. Further, it is within the scope of the invention to puncture the parison simultaneously with a plurality of small needles and by so doing provide a means to blow the article without having to introduce a large needle into the parison.

It is also within the scope of the invention to have the second needle completely suround the first needle so that after the pre-blow needle has punctured the parison, and supplied a small amount of pressure to the interior thereof, the second needle, surrounding the first needle, will then puncture the parison and blow the parison to the desired shape. The larger needle can be withdrawn first to allow the plastic material to flow over the hole left by the larger needle and then the smaller needle withdrawn to leave a minimum blow hole in the final article.

We claim:

1. A method for blow molding a hollow article from a hollow closed parison, the method comprising penetrating said hollow closed parison with a small pre-blow needle, introducing fluid into the interior of said parison through said small pre-blow needle, penetrating said parison with a larger second needle, said larger second needle having a diameter of ⅛ to 1 inch, and introducing fluid into said hollow parison to expand the same against the mold wall through said larger second needle.

2. A method for molding a hollow article according to claim 1 wherein at least one of the pre-blow needle and the second needle are retracted after the step of introducing fluid pressure into said parison through said second needle.

3. A method of molding a hollow article according to claim 1 wherein said parison is introduced between at least two mold sections, has pinched off a portion to provide a satellite cavity, the satellite cavity is punctured with said pre-blow needle, fluid pressure is introduced through said pre-blow needle to at least partially expand said satellite cavity, and the satellite cavity is punctured by said second needle whereupon said article is blown through pressure introduced through said second needle.

4. A process for molding a hollow article according to claim 3 wherein said pre-blow needle is retracted after the introduction of fluid pressure through said larger needle has commenced.

5. An apparatus for molding a hollow article comprising a mold having a hollow mold cavity therein, a small pre-blow needle adapted to puncture a hollow closed parison placed within said mold cavity, and a second needle larger than said pre-blow needle, said second needle having a diameter within the range of ⅛ inch to 1 inch, said second needle adapted to puncture said parison after fluid pressure has been introduced into said parison, and means for supplying fluid pressure to said parison through said pre-blow needle and through said second needle.

6. An apparatus according to claim 5 wherein at least one of said pre-blow needle and said second needle has a means to advance the same into and means to retract the same out from said mold cavity.

References Cited

UNITED STATES PATENTS

| | | | |
|---|---|---|---|
| 3,338,998 | 8/1967 | Di Settembrini | 264—94 |
| 3,342,916 | 9/1967 | Peters | 264—98 |

S. LEON BASHORE, Primary Examiner

JOHN H. HARMAN, Assistant Examiner

U.S. Cl. X.R.

65—166, 261, 300; 264—94, 97